US010440681B2

(12) United States Patent
Li et al.

(10) Patent No.: US 10,440,681 B2
(45) Date of Patent: Oct. 8, 2019

(54) RESOURCE SCHEDULING METHOD, BASE STATION, SCHEDULER, PROGRAM SOURCE SERVER, AND SYSTEM

(71) Applicant: HUAWEI TECHNOLOGIES CO., LTD., Shenzhen, Guangdong (CN)

(72) Inventors: Jia Li, Shanghai (CN); Jianhui Yao, Shanghai (CN); Jun Zhang, Shenzhen (CN); Kai Yan, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/965,058

(22) Filed: Apr. 27, 2018

(65) Prior Publication Data
US 2018/0249443 A1   Aug. 30, 2018

Related U.S. Application Data

(63) Continuation of application No. PCT/CN2015/092939, filed on Oct. 27, 2015.

(51) Int. Cl.
*H04W 72/00* (2009.01)
*H04W 4/06* (2009.01)
*H04L 12/18* (2006.01)

(52) U.S. Cl.
CPC ....... *H04W 72/005* (2013.01); *H04L 12/1877* (2013.01); *H04W 4/06* (2013.01); *H04L 12/189* (2013.01)

(58) Field of Classification Search
CPC .............................. H04W 72/005; H04W 4/06
See application file for complete search history.

(56) References Cited

U.S. PATENT DOCUMENTS

| 2010/0008280 | A1 | 1/2010 | Ornbo et al. |
| 2015/0043418 | A1 | 2/2015 | Jang et al. |
| 2016/0112345 | A1* | 4/2016 | Na ........................ H04L 47/806 |

FOREIGN PATENT DOCUMENTS

| CN | 101094433 A | 12/2007 |
| CN | 102090082 A | 6/2011 |
| CN | 102281503 A | 12/2011 |
| CN | 103391516 A | 11/2013 |
| WO | 2014191039 A1 | 12/2014 |

* cited by examiner

*Primary Examiner* — Ronald B Abelson
(74) *Attorney, Agent, or Firm* — Womble Bond Dickinson (US) LLP

(57) ABSTRACT

Embodiments relate to a resource scheduling method, a base station, a scheduler, a program source server, and a system. A method includes receiving, a session start request message comprising carries an SAI corresponding to a program source from a program source server; sending the session start request message to a base station corresponding to the SAI; receiving a session start response message from the base station; adding the base station to an IP multicast group; sending a resource scheduling message comprising information about a MA resource allocated to the program source to the base station; and receiving a resource scheduling response message from the base station.

18 Claims, 9 Drawing Sheets

RESOURCE SCHEDULING METHOD, BASE STATION, SCHEDULER, PROGRAM SOURCE SERVER, AND SYSTEM

CROSS-REFERENCE TO RELATED APPLICATIONS

This application is a continuation of International Application No. PCT/CN2015/092939, filed on Oct. 27, 2015, the disclosure of which is hereby incorporated by reference in its entirety.

TECHNICAL FIELD

The present invention relates to the wireless communications field, and in particular, to a resource scheduling method, a base station, a scheduler, a program source server, and a system.

BACKGROUND

Today, users prefer to watch a mobile video on an intelligent terminal such as a tablet computer. User behavior changes and an explosive increase in video services have increased pressure on wireless networks. To satisfy user requirement, evolved multimedia broadcast multicast service (eMBMS) broadcast solution based on a Long Term Evolution (LTE) technology may be used. The eMBMS broadcast solution has advantages such as high LTE bandwidth, high spectral efficiency, and almost no restriction on quantity of users for receiving content in a broadcast mode.

In an existing eMBMS broadcast solution, resource scheduling can require multiple network elements. The multiple network elements can include a broadcast-multicast service center (BM-SC), a multimedia broadcast multicast service gateway (MGW), a mobility management entity (MME), a multi-cell/multicast coordination entity (MCE), an evolved NodeB (eNodeB), and the like. In an existing resource scheduling method, a signaling procedure can be long, and multiple network elements may be required, for example, from a BM-SC to an MBMS-GW and an MME, then to an MCE and an eNodeB. Furthermore, an upper-level network element may only know an execution result of a lower-level network element and may not know a final execution result of a broadcast program. As a result, utilization of a broadcast channel resource can be low.

SUMMARY

Embodiments of the present invention provide a resource scheduling method, a base station, a scheduler, a program source server, and a system, to improve utilization of a broadcast channel resource.

According one embodiment, a resource scheduling method is provided, which can be applied to an eMBMS. The method includes receiving, by a scheduler, a session start request message sent by a program source server, where the session start request message includes a service area identifier (SAI) corresponding to a program source; sending, according to the SAI, the session start request message to a base station corresponding to the SAI; receiving a session start response message sent by the base station according to the session start request message; adding the base station to an Internet Protocol (IP) multicast group according to the session start response message; sending a resource scheduling message to the base station, where the resource scheduling message information regarding a multimedia broadcast multicast service single frequency network area (MA) resource allocated to the program source; and receiving a resource scheduling response message sent by the base station according to the resource scheduling message.

According to one embodiment, before the receiving, by a scheduler, a session start request message sent by a program source server, the method can further include receiving, by the scheduler, an MA status request message sent by the program source server, where the MA status request message carries the SAI; searching, according to the SAI, for an MA status corresponding to the SAI, where the status is used to reflect a resource usage of an MA; and sending an MA status response message to the program source server, where the MA status response message includes information regarding the MA status, so that the program source server selects a unicast manner or a broadcast manner according to the MA status to start a session.

According to one embodiment, receiving, by a scheduler, a session start request message sent by a program source server can further include receiving, by the scheduler, the session start request message sent by the program source server, where the session start request message is used to start a session in the broadcast manner; and before the sending a resource scheduling message to the base station, the method can further include performing program admission and mapping according to the resource usage of the MA and a priority of a to-be-broadcast program of the program source; and allocating an MA air interface resource to at least one program that is successfully admitted and mapped.

According to one embodiment, receiving, by a scheduler, a session start request message sent by a program source server can include receiving, by the scheduler, the session start request message sent by the program source server by using a broadcast-multicast service center.

According to one embodiment, a resource scheduling method is provided which can be applied to an eMBMS. The method includes sending, by a program source server, a session start request message to a scheduler, where the session start request message includes a SAI corresponding to a program source, so that the scheduler allocates an MA resource to the program source according to the SAI.

According to one embodiment, before the sending, by a program source server, a session start request message to a scheduler, the method can further include sending, by the program source server, an MA status request message to the scheduler, where the MA status request message includes the SAI; receiving an MA status response message sent by the scheduler, where the MA status response message carries information about an MA status corresponding to the SAI, and the status is used to reflect a resource usage of an MA; and selecting, by the program source server, a unicast manner or a broadcast manner according to the MA status to start a session.

According to one embodiment, the selecting, by the program source server, a unicast manner or a broadcast manner according to the MA status to start a session includes when the MA status reflects that the resource usage of the MA satisfies a preset condition, and a program on-demand rate in the MA exceeds a preset threshold, selecting the broadcast manner to start a session.

According to one embodiment, the sending, by a program source server, a session start request message to a scheduler includes sending, by the program source server, the session start request message to the scheduler by using a broadcast-multicast service center.

According to one embodiment, a resource scheduling method is provided, which can be applied to an eMBMS.

The method includes receiving, by a base station, a session start request message sent by a scheduler, where the session start request message includes a SAI corresponding to a program source; sending a session start response message to the scheduler according to the session start request message; receiving a resource scheduling message sent by the scheduler, where the resource scheduling message includes information regarding an MA resource allocated to the program source; and sending a resource scheduling response message to the scheduler according to the resource scheduling message.

According to one embodiment, a scheduler is provided, where the scheduler can be applied to an eMBMS and includes a receiving unit, a processing unit, and a sending unit. The receiving unit can be configured to receive a session start request message sent by a program source server, where the session start request message carries a SAI corresponding to a program source. The sending unit can be configured to send, according to the SAI received by the receiving unit, the session start request message to a base station corresponding to the SAI. The receiving unit can be further configured to receive a session start response message sent by the base station according to the session start request message. The processing unit can be configured to add the base station to an IP multicast group according to the session start response message received by the receiving unit. The sending unit can be further configured to send a resource scheduling message to the base station, where the resource scheduling message includes information regarding an MA resource allocated to the program source. The receiving unit can be further configured to receive a resource scheduling response message sent by the base station according to the resource scheduling message.

According to one embodiment, the receiving unit can be further configured to, before receiving the session start request message sent by the program source server, receive an MA status request message sent by the program source server, where the MA status request message carries the SAI. The processing unit can be further configured to search, according to the SAI received by the receiving unit, for an MA status corresponding to the SAI, where the status is used to reflect a resource usage of an MA. The sending unit can be further configured to send an MA status response message to the program source server, where the MA status response message includes information regarding the MA status, so that the program source server selects a unicast manner or a broadcast manner according to the MA status to start a session.

According to one embodiment, the receiving unit can be configured to receive the session start request message sent by the program source server, where the session start request message is used to start a session in the broadcast manner. The processing unit can be further configured to, before the sending unit sends the resource scheduling message to the base station, perform program admission and mapping according to the resource usage of the MA and a priority of a to-be-broadcast program of the program source; and allocate an MA air interface resource to at least one program that is successfully admitted and mapped.

According to one embodiment, the receiving unit can be configured to receive the session start request message sent by the program source server by using a broadcast-multicast service center.

According to one embodiment, a program source server is provided, which can be applied to an eMBMS. The program source server can include a sending unit, and the sending unit can be configured to send a session start request message to a scheduler, where the session start request message includes a SAI corresponding to a program source, so that the scheduler allocates an MA resource to the program source according to the SAI.

According to one embodiment, the sending unit can be further configured to send an MA status request message to the scheduler before sending the session start request message to the scheduler, where the MA status request message includes the SAI. The program source server can further include a receiving unit and a processing unit, where the receiving unit can be configured to receive an MA status response message sent by the scheduler, where the MA status response message includes information regarding an MA status corresponding to the SAI, and the status can be used to reflect a resource usage of an MA. The processing unit can be configured to select, according to the MA status received by the receiving unit, a unicast manner or a broadcast manner to start a session.

According to one embodiment, the processing unit can be configured to, when the MA status received by the receiving unit reflects that the resource usage of the MA satisfies a preset condition and a program on-demand rate in the MA exceeds a preset threshold, select the broadcast manner to start a session.

According to one embodiment, the sending unit is configured to send the session start request message to the scheduler by using a broadcast-multicast service center.

According to one embodiment, a base station is provided, which can be applied to an eMBMS. The base station can include a sending unit and a receiving unit. The receiving unit can be configured to receive a session start request message sent by a scheduler, where the session start request message includes a SAI corresponding to a program source. The sending unit can be configured to send a session start response message to the scheduler according to the session start request message received by the receiving unit. The receiving unit can be further configured to receive a resource scheduling message sent by the scheduler, where the resource scheduling message includes information regarding an MA resource allocated to the program source. The sending unit can be further configured to send a resource scheduling response message to the scheduler according to the resource scheduling message received by the receiving unit.

According to one embodiment, a scheduler is provided, which can be applied to an eMBMS. The scheduler can include a memory, a receiver, a processor, and a transmitter. The memory can be configured to store a program instruction.

According to one embodiment, the processor can be configured to perform, according to the program instruction stored in the memory, the following operation receiving, by using the receiver, a session start request message sent by a program source server, where the session start request message carries a SAI corresponding to a program source; sending, by using the transmitter according to the SAI received by the receiver, the session start request message to a base station corresponding to the SAI; receiving, by using the receiver, a session start response message sent by the base station according to the session start request message; adding the base station to an IP multicast group according to the session start response message received by the receiver; sending a resource scheduling message to the base station by using the transmitter, where the resource scheduling message carries information about an MA resource allocated to the program source; and receiving, by using the receiver, a resource scheduling response message sent by the base station according to the resource scheduling message.

According to one embodiment, the processor is further configured to perform, according to the program instruction stored in the memory, the following operation receiving, by using the receiver before the receiving a session start request message sent by a program source server, an MA status request message sent by the program source server, where the MA status request message includes the SAI; searching, according to the SAI received by the receiver, for an MA status corresponding to the SAI, where the status is used to reflect a resource usage of an MA; and sending an MA status response message to the program source server by using the transmitter, where the MA status response message includes information regarding the MA status, so that the program source server selects a unicast manner or a broadcast manner according to the MA status to start a session.

According to one embodiment, the processor can perform the operation of receiving, by using the receiver, a session start request message sent by a program source server and further includes receiving, by using the receiver, the session start request message sent by the program source server, where the session start request message is used to start a session in the broadcast manner. The processor can be further configured to perform, according to the program instruction stored in the memory, the following operation, before the sending a resource scheduling message to the base station by using the transmitter, performing program admission and mapping according to the resource usage of the MA and a priority of a to-be-broadcast program of the program source; and allocating an MA air interface resource to at least one program that is successfully admitted and mapped.

According to one embodiment, the processor can perform the operation of receiving, by using the receiver, a session start request message sent by a program source server further including receiving, by using the receiver, the session start request message sent by the program source server by using a broadcast-multicast service center.

According to one embodiment, a program source server is provided, which can be applied to an eMBMS. The program source server can include a memory, a processor, and a communications interface. The memory can be configured to store a program instruction. The processor can be configured to perform, according to the program instruction stored in the memory, the following operation sending a session start request message to a scheduler by using the communications interface, where the session start request message includes a SAI corresponding to a program source, so that the scheduler allocates an MA resource to the program source according to the SAI.

According to one embodiment, the processor can be further configured to perform, according to the program instruction stored in the memory, the following operation sending an MA status request message to the scheduler before the sending a session start request message to a scheduler by using the communications interface, where the MA status request message carries the SAI; receiving, by using the communications interface, an MA status response message sent by the scheduler, where the MA status response message includes information regarding an MA status corresponding to the SAI, and the status is used to reflect a resource usage of an MA; and selecting a unicast manner or a broadcast manner according to the received MA status to start a session.

According to one embodiment, the processor can perform the operation of selecting a unicast manner or a broadcast manner according to the received MA status to start a session which further includes, when the received MA status reflects that the resource usage of the MA satisfies a preset condition, and a program on-demand rate in the MA exceeds a preset threshold, selecting the broadcast manner to start a session.

According to one embodiment, the processor can perform the operation of sending a session start request message to a scheduler by using the communications interface which further includes sending the session start request message to the scheduler by using a broadcast-multicast service center.

According to one embodiment, the base station can be applied to an eMBMS and includes a memory, a processor, a transmitter, and a receiver. The memory can configured to store a program instruction. The processor can configured to perform, according to the program instruction stored in the memory, the following operation receiving, by using the receiver, a session start request message sent by a scheduler, where the session start request message includes a SAI corresponding to a program source; sending, by using the transmitter, a session start response message to the scheduler according to the session start request message received by the receiver; receiving, by using the receiver, a resource scheduling message sent by the scheduler, where the resource scheduling message includes information regarding an MA resource allocated to the program source; and sending, by using the transmitter, a resource scheduling response message to the scheduler according to the resource scheduling message received by the receiver.

According to one embodiment, a scheduling system is provided, which can be applied to an eMBMS. The scheduling system can include a scheduler, a program source server, and a base station. The scheduler can be configured to receive a session start request message sent by the program source server, where the session start request message includes a SAI corresponding to a program source; send, according to the SAI, the session start request message to the base station corresponding to the SAI; receive a session start response message sent by the base station according to the session start request message; add the base station to an IP multicast group according to the session start response message; send a resource scheduling message to the base station, where the resource scheduling message includes information regarding an MA resource allocated to the program source; and receive a resource scheduling response message sent by the base station according to the resource scheduling message.

According to one embodiment, the program source server can be configured to send the session start request message to the scheduler, where the session start request message includes the SAI corresponding to the program source, so that the scheduler allocates the MA resource to the program source according to the SAI.

According to one embodiment, the base station can be configured to receive the session start request message sent by the scheduler, where the session start request message carries the SAI corresponding to the program source; send the session start response message to the scheduler according to the session start request message; receive the resource scheduling message sent by the scheduler, where the resource scheduling message includes the information regarding the MA resource allocated to the program source; and send the resource scheduling response message to the scheduler according to the resource scheduling message.

The disclosed embodiments can provide a resource scheduling method, which can be applied to the eMBMS, and involve a scheduler, program source server, and base station.

For one example, a mapping relationship can exist between a program source and an air interface broadcast channel in the scheduler. As such, objectives of fully utilizing the air interface broadcast channel and accurately delivering a program can be achieved, and utilization of a broadcast channel resource can be effectively improved.

BRIEF DESCRIPTION OF DRAWINGS

The appended drawings illustrate examples and are, therefore, exemplary embodiments and are not considered to be limiting in scope.

DESCRIPTION OF EMBODIMENTS

Figure 1:
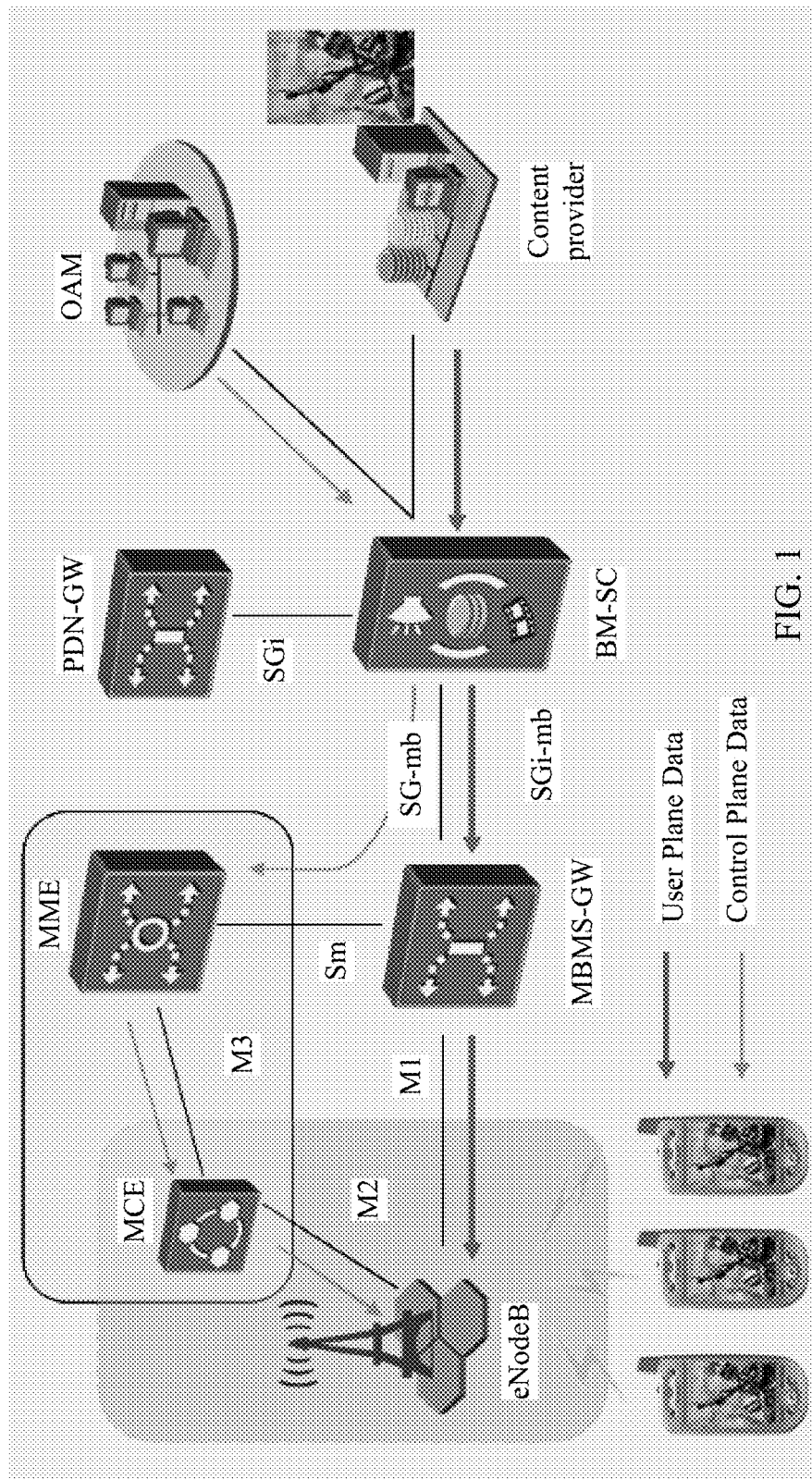
FIG. 1 is a schematic diagram of a network architecture on which a resource scheduling method is based according to one embodiment.

FIG. 1 is a schematic diagram of a network architecture on which a resource scheduling method is based according to one embodiment. For one embodiment, when eMBMS resource scheduling is performed, to simplify a signaling procedure and pass through fewer network elements, a new scheduler can be added to a general eMBMS network architecture. The scheduler can be dedicatedly for resource scheduling of a broadcast service, but may not be used for resource scheduling of a unicast service. In this way, the unicast service is not affected.

For one embodiment, the scheduler can provide eNodeB with M2 and M1 interface functions specified in the 3rd Generation Partnership Project (3GPP) standard protocol. The M2 interface can be a control plane interface and used for exchange of a session message and a scheduling message. The M1 interface can be a service plane interface and used for service data transmission.

For one embodiment, the scheduler can provide a program source server with a customized application programming interface (API). The API may be included on the Hypertext Transfer Protocol (HTTP), or may be included on the Stream Control Transmission Protocol (SCTP). The program source server may provide a user with various application services by using the Internet. In this way, the program source server may be referred to as an application server.

For one embodiment, the scheduler can provide an operation and maintenance interface, so that operation and maintenance personnel add, on a maintenance device, broadcast program information to the scheduler by using a command. For one embodiment, the scheduler can schedule, by using a mapping between a program source and an air interface resource, program source content to a corresponding multimedia broadcast multicast service single frequency network area (MA) for broadcasting, and can finally perform an eMBMS broadcast to an end user by using an LTE air interface.

For one embodiment, the scheduler can be introduced into an existing network architecture, so that resource scheduling of a broadcast service can be implemented merely by means of signaling interaction between three network elements: the program source server, the scheduler, and the eNodeB. In this way, the signaling procedure can effectively be simplified, and required network elements can be reduced. In addition, a clear mapping relationship can exist between a program source and an air interface broadcast channel in the scheduler. Thus, objectives such as fully utilizing the air interface broadcast channel and accurately delivering a program can be achieved, and utilization of a broadcast channel resource can effectively be improved.

Figure 2:
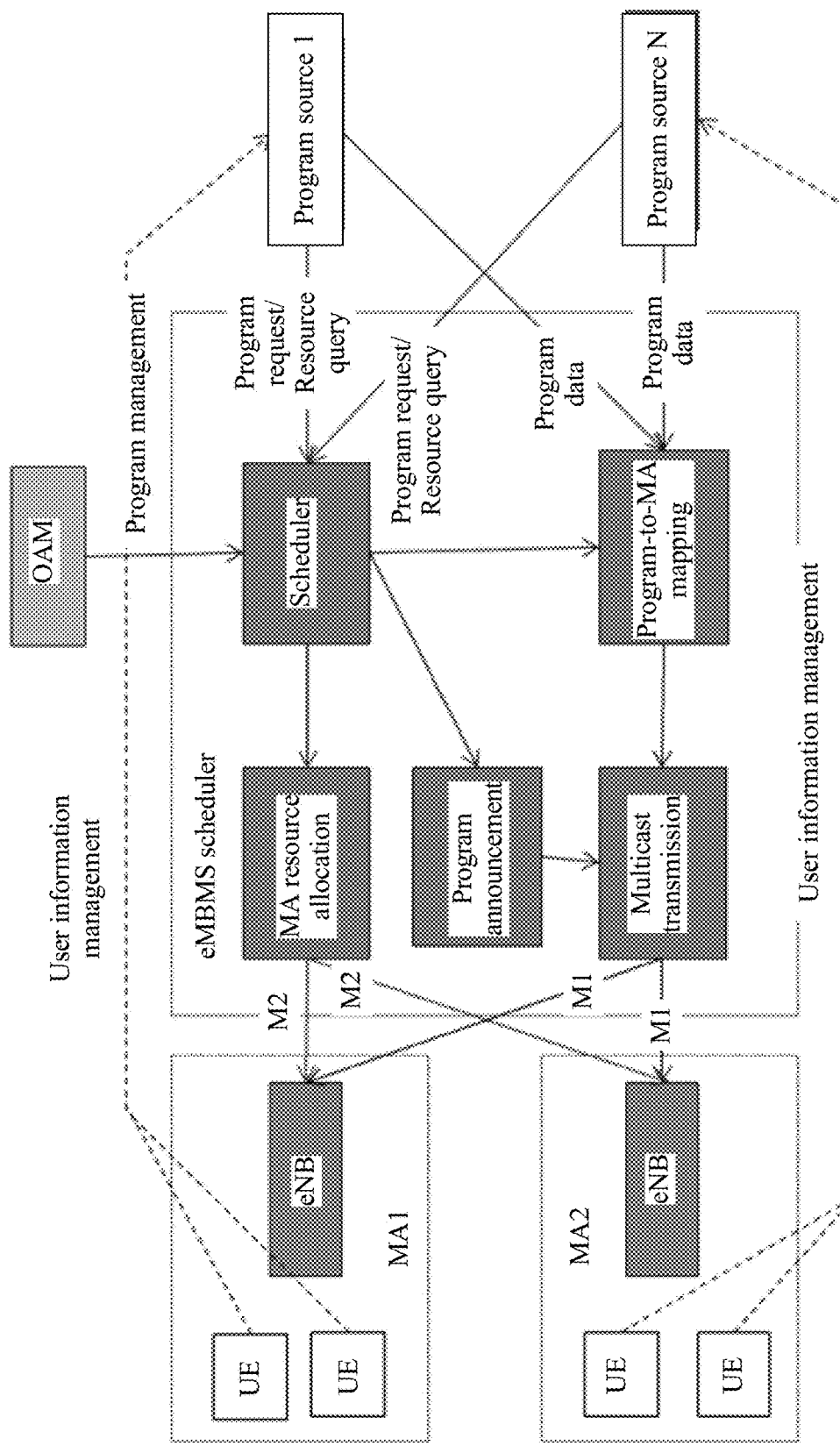
FIG. 2 is a functional block diagram of a scheduler according to one embodiment.

FIG. 2 is a functional block diagram of a scheduler according to one embodiment. The scheduler can be used to schedule a broadcast resource in an eMBMS. The scheduler may be referred to as an eMBMS scheduler. The scheduler can include five function modules including a scheduler module, an MA resource allocation module, a program announcement module, a program-to-MA mapping module, and a multicast transmission module. The scheduler module can be configured to receive, by using an operation and maintenance interface, program management information sent by an operation administration and maintenance (OAM) device, and add or remove broadcast program information according to the program management information. The scheduler module can be further configured to receive, by using an API, a program request message or a resource query message sent by a program source server. The MA resource allocation module can be configured to allocate a corresponding MA resource to the program source server according to an indication of the scheduler module, and send information about the allocated MA resource to an eNodeB (eNB) by using an M2 interface. The program announcement module can also be configured to announce to-be-broadcast program information to the multicast transmission module. The program-to-MA mapping module can be configured to obtain program data from the program source server, map the program data onto the MA resource allocated to the program source server, and send the foregoing mapping relationship to the multicast transmission module. The multicast transmission module can be configured to receive, from the program-to-MA mapping module, the mapping relationship between the program data and the MA resource, and send the program data to the eNodeB by using an M1 interface according to the foregoing mapping relationship.

For one embodiment, referring to FIG. 2, the program source server is responsible for managing user information, and may initiate a program broadcast request to the scheduler according to an on-demand request of a user. The scheduler can perform broadcast resource scheduling according to the program broadcast request. In this example, a program broadcast may not only be initiated by the program source server, but also may be initiated by the OAM device. For example, an administrator may add broadcast program information to the scheduler by using the OAM device.

Figure 3A:
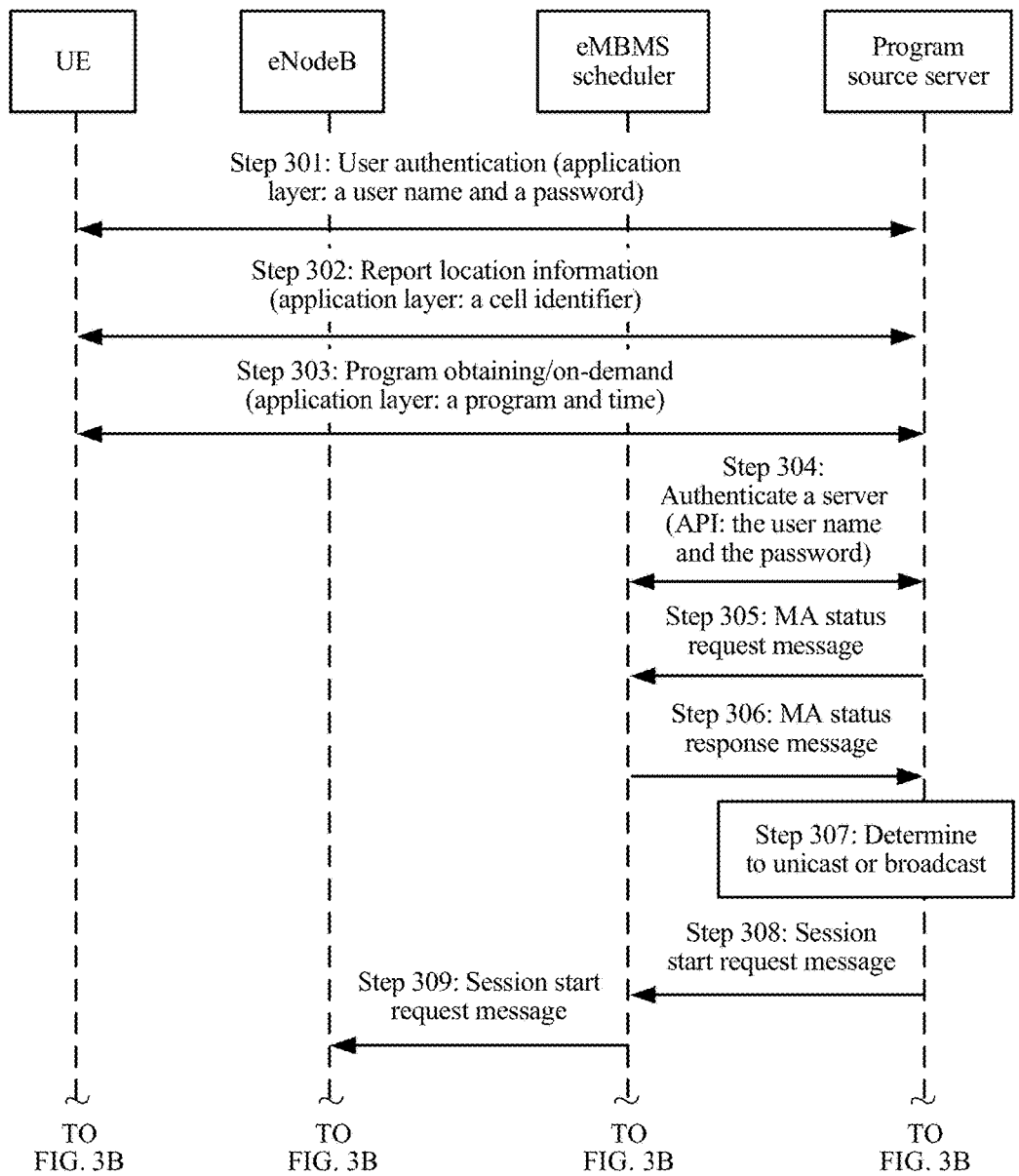
FIG. 3A and FIG. 3B are a signal flow diagram of a resource scheduling method according to one embodiment.
Figure 3B:
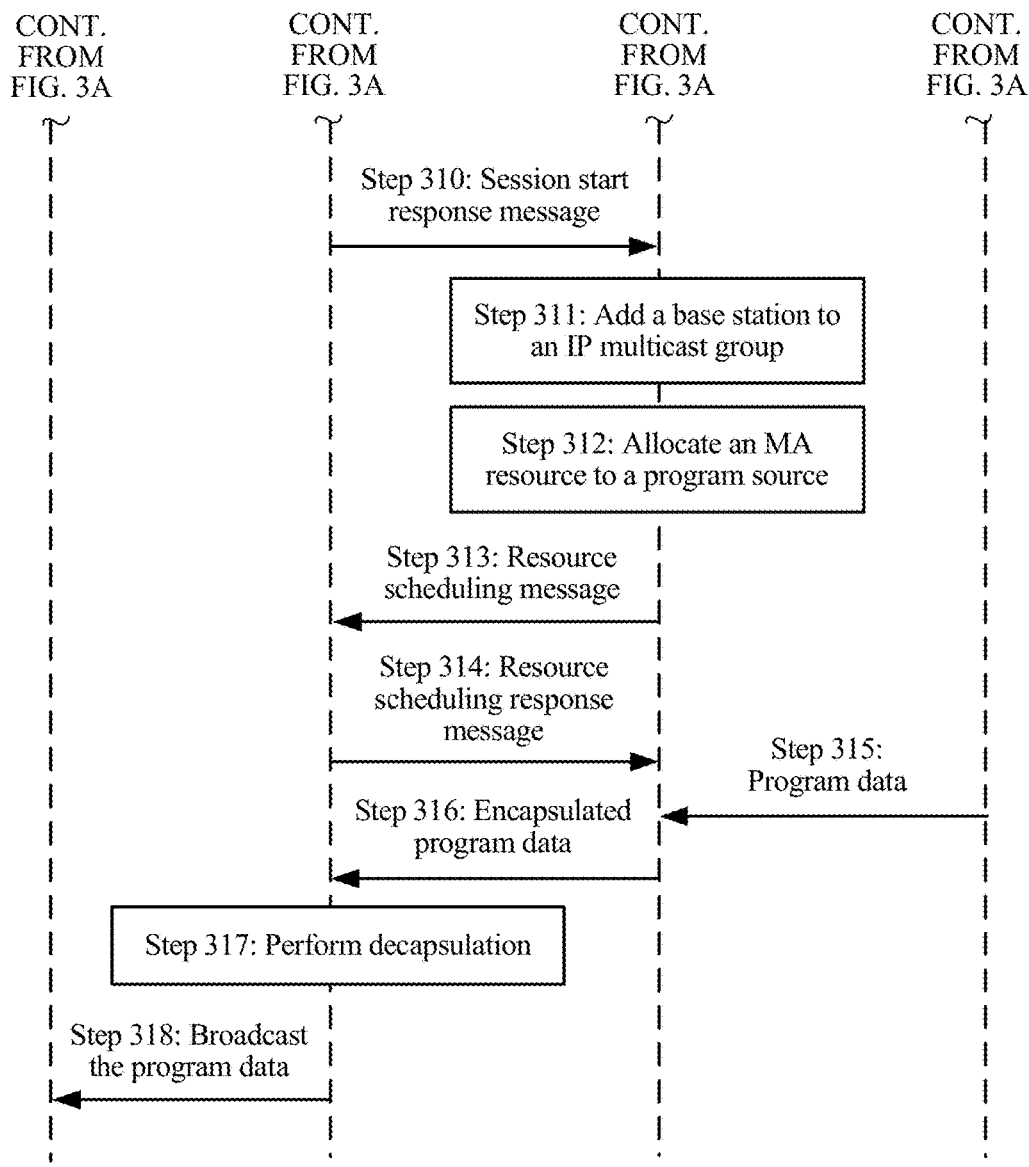

FIG. 3A and FIG. 3B are a signal flow diagram of a resource scheduling method according to one embodiment. The method of FIGS. 3A-3B can be applied to an eMBMS, and resource scheduling of a broadcast resource can be implemented by means of signaling interaction between several network elements: user equipment (UE), an eNodeB, an eMBMS scheduler, and a program source server. The UE may also be referred to as an application client (APP client), and the scheduler can be configured to implement functions of network elements: a BM-SC, an MBMS-GW, an MME, and an MCE in an existing network architecture. The method can be described in connection with the following steps.

At step 301, the program source server can obtain a user name and a password from the UE, and perform user authentication according to the user name and the password. When a result of the user authentication is successful, the method can proceed to the following steps; otherwise, the method ends.

At step 302, the program source server can receive location information reported by the UE. The foregoing location information may be specifically a cell identifier (CellID).

At step 303, the program source server can receive a program obtaining/on-demand request message sent by the UE. The request message may include information such as a program name and program play time.

For one embodiment, some users can be subscribers of a program source 1, program source 2, and an APP corresponding to a program source can be installed on user equipment. A user can log on to the program source server by using the user equipment to request a program and reports current location information of the UE. The program source server can performs authentication, charging, and information management on a subscriber.

At step 304, the scheduler can receive the user name and the password that are sent by the program source server, and authenticate the program source server according to the user name and the password. When an authentication result is successful, the method can proceed to the following steps can be; otherwise, the method ends.

In this example, the program source server can be an authorized user that has a permission to send a program on the eMBMS. User authentication and charging functions may be completed on the eMBMS scheduler, or may be completed by an operator business support system (BSS). Each program source can correspond to one or more SAs and is identified by using a SAI.

At step 305, the scheduler can receives an MA status request message sent by the program source server, where the MA status request message includes a service area identifier SAI corresponding to a program source.

For one embodiment, a customized API interface can exist between the scheduler and the program source server. The program source server can query for an eMBMS broadcast resource from the scheduler by using the API interface. The scheduler can return broadcast resource information to the program source server. The broadcast resource information can includes total MA broadcast bandwidth, remaining bandwidth, a cell list, and the like. After receiving the MA status request message, the scheduler may search, according to the SAI, for an MA status corresponding to the SAI. The status can be used to reflect a resource usage of an MA.

For one embodiment An SA is a broadcast service area and is a service concept, for example, a district in a city, or a campus. An MA can be a base station networking area, and time of base stations in this area is strictly synchronized. The MA can be planned according to a network, some base stations belong to an MA1, some base stations belong to an MA2, and MA planning data can be stored on the scheduler.

At step 306, the scheduler can send an MA status response message to the program source server, where the MA status response message includes information regarding an MA status corresponding to the SAI.

At step 307, the program source server can select a unicast manner or a broadcast manner according to the MA status to start a session.

In this example, when the MA status reflects that the resource usage of the MA satisfies a preset condition, and a program on-demand rate in the MA exceeds a preset threshold, the broadcast manner can be selected to start a session. For example, after obtaining an MA resource, the program source server may directly initiate a broadcast request when a program on-demand rate in an MA exceeds a particular threshold.

At steps 301 to 307, these steps can be optional. The program source server may directly initiate a program broadcast request to the scheduler when no program on-demand request of a user is obtained.

At step 308, the program source server can send a session start request message to the scheduler. The session start request message includes the service area identifier SAI corresponding to the program source. For one embodiment, the session start request message may further include an identifier of the program source server (OTT id), a uniform resource locator (URL), an MA identifier (MA id), and video quality information (Qos). The session start request message can be used to start a session in the broadcast manner.

At step 309, the scheduler can receive the session start request message sent by the program source server, and send, according to the SAI carried in the session start request message, the session start request message to a base station corresponding to the SAI.

At step 310, the scheduler can receive a session start response message sent by the base station according to the session start request message.

At step 311, the scheduler can add the base station to an IP multicast group according to the session start response message.

At step 312, the scheduler can allocate an MA resource to the program source. For example, program admission and mapping can be performed according to the resource usage of the MA and a priority of a to-be-broadcast program of the program source, and an MA air interface resource can be allocated to at least one program that is successfully admitted and mapped.

At step 313, the scheduler can send a resource scheduling message to the base station, where the resource scheduling message includes information about the MA resource allocated to the program source.

At step 314, the scheduler can receive a resource scheduling response message sent by the base station according to the resource scheduling message.

For one embodiment, after the MA resource is allocated to the program source in the foregoing procedure, program source data may be downloaded, air interface resource allocation information is delivered to the eNB by using an M2 interface. The program data can be delivered to the eNB by using an M1 interface, so as to complete an eMBMS broadcast of a program. For example, the program broadcast may be performed by utilizing the MA resource allocated to the program source in the following procedure.

At step 315, the program source server can send program data to the scheduler. The program data can be sent to the user equipment in a broadcast manner. In this way, the program data may be referred to as MBMS data.

At step 316, the scheduler can receive the program data sent by the program source server, encapsulate the program data into a data packet, and then send the data packet to the base station. Encapsulating the program data into the data packet may add the program data (the MBMS data) to synchronous data (SYNC) and general packet radio service tunneling protocol user plane (GTPU) data.

At step 317, the base station can receive the data packet sent by the scheduler, and decapsulate the data packet to obtain the program data.

At step 318, the base station can send the program data to the UE in a broadcast manner according to the MA resource allocated to the program source. In addition, when the program source server learns that a program on-demand rate in an MA is reduced to a particular threshold, the program source server may initiate a request to the scheduler to terminate the program broadcast, and the scheduler recycles the air interface resource. Alternatively, after normal play of a program is completed, the scheduler can automatically recycle the air interface resource.

For one embodiment, the scheduler may adjust air interface broadcast bandwidth in real time according to a traffic model of the MA, a program quantity, a priority, and the like, so as to fully utilize the broadcast resource. The traffic model is traffic volume distribution in a wireless networking area. For example, a traffic peak occurs in the morning or night in a residential area, and a traffic peak occurs in a working hour in an office area.

For one embodiment, operation personnel may communicate with the scheduler by using a maintenance device, and may add, modify, remove a program on the scheduler by using an operation maintenance command. After successfully adding a program, the scheduler can obtain program data from a specified program source server to perform an eMBMS broadcast. That is, in this example, the eMBMS broadcast may be a broadcast that is initiated by the program source server after the program source server can receive an on-demand request of a user, or may be a broadcast that is initiated by the scheduler after an administrator adds a program identifier to the scheduler.

Disclosed embodiments can provide the resource scheduling method, which can be applied to the eMBMS. The scheduler can receive the session start request message sent by the program source server, where the session start request message includes the service area identifier SAI corresponding to the program source server. The scheduler can send, according to the SAI, the session start request message to the base station corresponding to the SAI. The scheduler can receive the session start response message sent by the base station according to the session start request message, and adds the base station to the IP multicast group according to the session start response message. The scheduler can allocate the MA resource to the program source server and send the resource scheduling message to the base station, where the resource scheduling message includes the information regarding the MA resource allocated to the program source server. The scheduler can receive the resource scheduling response message sent by the base station according to the resource scheduling message. In the disclosed embodiments, the method can be associated with the scheduler, the program source server, and the base station, and a clear mapping relationship can exist between a program source and an air interface broadcast channel in the scheduler. Thus, objectives of fully utilizing the air interface broadcast channel and accurately delivering a program can be achieved, and utilization of a broadcast channel resource can be effectively improved.

Figure 4:
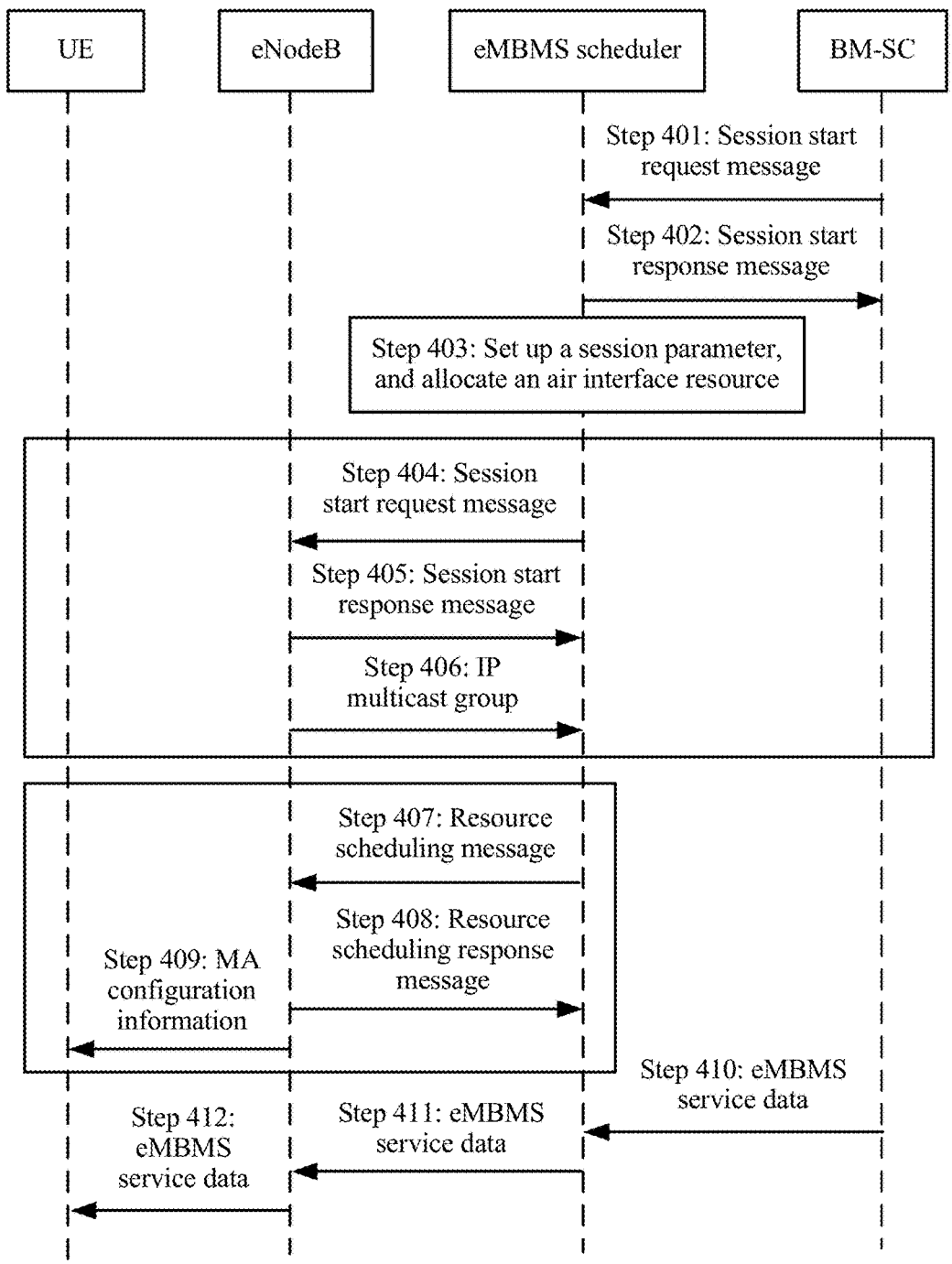
FIG. 4 is a signal flow diagram of a resource scheduling method according to a second embodiment of the present invention.
Figure 5:
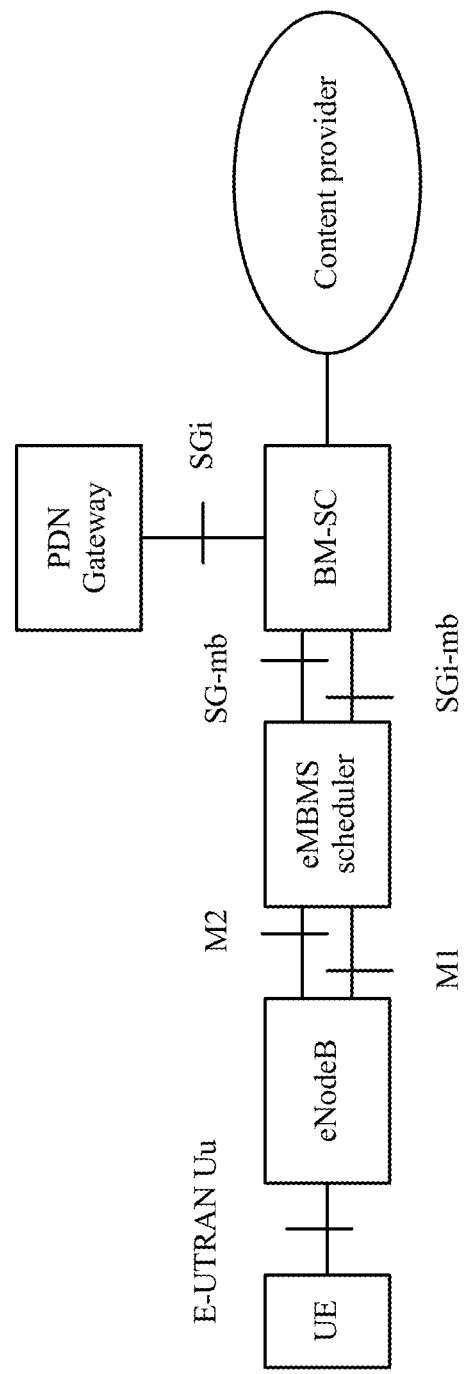
FIG. 5 is a schematic diagram of a scheduler interface a according to one embodiment.

FIG. 4 is a signal flow diagram of a resource scheduling method according to one embodiment. The method can be applied to an eMBMS, and resource scheduling of a broadcast resource can be implemented by means of signaling interaction between several network elements: UE, an eNodeB, an eMBMS scheduler, a BM-SC, and a program source server. The program source server may further be referred to as a content provider. The scheduler can be configured to implement functions of network elements: an MBMS-GW, an MME, and an MCE in an existing network architecture. The method can be based on a network architecture shown in FIG. 1. For one embodiment, referring to a schematic diagram of a scheduler interface shown in FIG. 5, the scheduler can provide functions of M2 and M1 interfaces to the external, that is, is connected to the eNodeB, but can also provide functions of SG-mb and SGi-mb interfaces to the external, that is, is connected to the BM-SC. The SG-mb interface is a control plane interface between the BMSC and the MBMS GW can be used for session message exchange. The SGi-mb interface is a service plane interface between the BMSC and the MBMS GW and is used for service data transmission.

For one embodiment, the scheduler may provide a human-computer interaction interface to the external. A user may complete configuration of external interface data by using the interface. During provisioning of an eMBMS, an operator only needs to deploy the three network elements: the BMSC, the eNodeB, and the scheduler, configure the M1 and M2 interfaces between the scheduler and the eNodeB, and configure the SGmb and SGi-mb interfaces between the scheduler and the BM-SC, without deploying the MME, the MBMS GW, and the MCE, and configuring an M3 interface and an Sm interface.

For one embodiment, different from the resource scheduling method provided in the first embodiment of the present invention, an interface between the scheduler and the program source server may not exist. As such, signaling interaction between the program source server and the scheduler may need to be forwarded by using the BM-SC. One example implementation procedure of the method is briefly described below. Referring to FIG. 4, the method can include the following steps.

At step 401, the BM-SC can initiate an eMBMS session start procedure and can send a session start request message to the scheduler.

At step 402, the scheduler can send a session start response message to the BM-SC.

At step 403, the scheduler can set up a session parameter, and allocates an eMBMS air interface resource to a session. For one embodiment, setting up the session parameter may specifically include allocating an M1 interface multicast destination IP address, a GTPU tunnel endpoint identifier (C-tunnel endpoint identifier, C-TEID), and the like to the session.

At step 404, the scheduler can send the session start request message to the eNodeB.

At step 405, the eNodeB can send a session start response message to the scheduler.

At step 406, the scheduler can add the eNodeB to an IP multicast group.

At step 407, the scheduler can send a resource scheduling message to the eNodeB.

At step 408, the eNodeB can send a resource scheduling response message to the scheduler.

At step 409, the eNodeB can send MA configuration information to the UE.

For one example, the eNodeB can send the MA configuration information by using an MBMS point-to-multipoint control channel (MCCH channel). For one example, a control plane session can be a start procedure. After the control plane session start procedure ends, the following user plane service data transmission procedure may be performed.

At step 410, the BM-SC can send eMBMS service data to the scheduler.

At step 411, the scheduler can send the eMBMS service data to the eNodeB by using the M1 interface.

At step 412, the eNodeB can send the eMBMS service data to the UE by using the allocated air interface resource. For one embodiment, the eNodeB may specifically send the eMBMS service data by using an MBMS point-to-multipoint service channel (MTCH channel).

In this example, a device and a network element can be integrated, functions of the MCE, the MME, the MBMS-GW, and the BMSC on a network side are implemented by one eMBMS scheduler, or functions of the MCE, the MME, and the MBMS-GW are implemented by one eMBMS scheduler. As such, interfaces between network elements can be reduced, and a service procedure can be simplified. For one embodiment, after the MCE, the MME, the MBMS-GW, and the BMSC on the network side can be integrated, the SG-mb interface, the Sm interface, and the M3 interface can become internal interfaces; or after the MCE, the MME, and the MBMS-GW on the network side can be integrated, the Sm interface and the M3 interface can become internal interfaces. The eMBMS scheduler can be provided, directly connected to the eNB downwards, and directly connected to the program source server upwards, and provides mapping and scheduling from a program to an air interface broadcast resource. The scheduler can cooperate with a program source to complete accurate conversion between unicast and broadcast. In addition, the scheduler may adjust air interface broadcast bandwidth in real time according to an MA traffic model, a program quantity, a priority, and the like, so as to fully utilize a broadcast resource.

Figure 6:
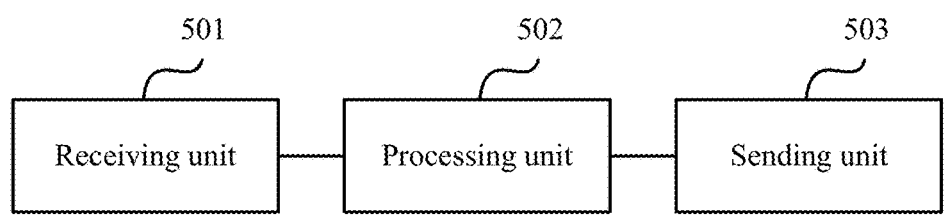
FIG. 6 is a schematic structural diagram of a scheduler according to one embodiment.

FIG. 6 is a schematic structural diagram of a scheduler according to one embodiment. The scheduler can be applied to an eMBMS and configured to perform the resource scheduling method provided in the disclosed embodiments. The scheduler can include a receiving unit 501, a processing unit 502, and a sending unit 503. The receiving unit 501 can be configured to receive a session start request message sent by a program source server, where the session start request message carries a SAI corresponding to a program source. The sending unit 503 can be configured to send, according to the SAI received by the receiving unit 501, the session start request message to a base station corresponding to the SAI. The receiving unit 501 can be further configured to receive a session start response message sent by the base station according to the session start request message. The processing unit 502 can be configured to add the base station to an IP multicast group according to the session start response message received by the receiving unit 501.

For one embodiment, the sending unit 503 can be further configured to send a resource scheduling message to the base station, where the resource scheduling message carries information about an MA resource allocated to the program source. The receiving unit 501 can be further configured to receive a resource scheduling response message sent by the base station according to the resource scheduling message. For another embodiment, the receiving unit 501 can be further configured to, before receiving the session start request message sent by the program source server, receive an MA status request message sent by the program source server, where the MA status request message carries the SAI.

For one embodiment, the processing unit 502 can be further configured to search, according to the SAI received by the receiving unit 501, for an MA status corresponding to the SAI, where the status is used to reflect a resource usage of an MA. The sending unit 503 can be further configured to send an MA status response message to the program source server, where the MA status response message carries information about the MA status, so that the program source server selects a unicast manner or a broadcast manner according to the MA status to start a session.

Optionally, the receiving unit 501 can be configured to receive the session start request message sent by the program source server, where the session start request message is used to start a session in the broadcast manner. The processing unit 502 can be further configured to, before the sending unit 503 sends the resource scheduling message to the base station, perform program admission and mapping according to the resource usage of the MA and a priority of a to-be-broadcast program of the program source; and allocate an MA air interface resource to at least one program that is successfully admitted and mapped. For another embodiment, the receiving unit 501 can be configured to receive the session start request message sent by the program source server by using a broadcast-multicast service center.

Figure 7:
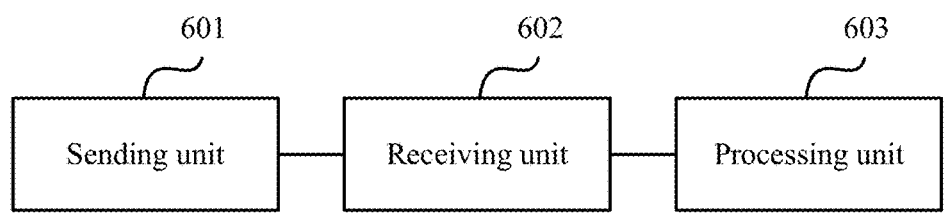
FIG. 7 is a schematic structural diagram of a program source server according to one embodiment.

FIG. 7 is a schematic structural diagram of a program source server according to one embodiment. The program source server can be applied to an eMBMS and configured to perform the resource scheduling disclosed methods. The program source server can include a sending unit 601. The sending unit 601 can be configured to send a session start request message to a scheduler, where the session start request message includes a SAI corresponding to a program source, so that the scheduler can allocate an MA resource to the program source according to the SAI. Optionally, the sending unit 601 can be further configured to send an MA status request message to the scheduler before sending the session start request message to the scheduler, where the MA status request message includes the SAI.

For one embodiment, the program source server can further include a receiving unit 602 and a processing unit 603. The receiving unit 602 can be configured to receive an MA status response message sent by the scheduler, where the MA status response message includes information regarding an MA status corresponding to the SAI, and the status is used to reflect a resource usage of an MA. The processing unit 603 can be configured to select, according to the MA status received by the receiving unit 602, a unicast manner or a broadcast manner to start a session. Optionally, the processing unit 603 can be configured to, when the MA status received by the receiving unit 602 reflects that the resource usage of the MA satisfies a preset condition, and a program on-demand rate in the MA exceeds a preset threshold, select the broadcast manner to start a session. In another embodiment, the sending unit 601 can be configured to send the session start request message to the scheduler by using a broadcast-multicast service center.

Figure 8:
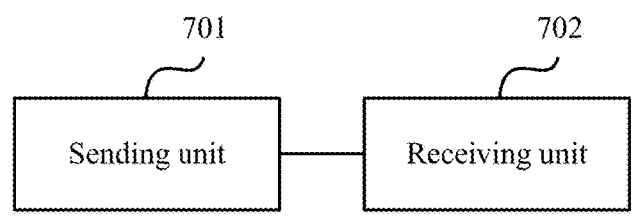
FIG. 8 is a structural diagram of a base station according to one embodiment.

FIG. 8 is a structural diagram of a base station according to one embodiment. The base station can be applied to an eMBMS and configured to perform methods disclosed herein. The base station can include a sending unit 701 and a receiving unit 702.

For one embodiment, the receiving unit 702 can be configured to receive a session start request message sent by a scheduler, where the session start request message carries a SAI corresponding to a program source. The sending unit 701 can be configured to send a session start response message to the scheduler according to the session start request message received by the receiving unit 702. The receiving unit 702 can be further configured to receive a resource scheduling message sent by the scheduler, where the resource scheduling message carries information about an MA resource allocated to the program source. For one embodiment, the sending unit 701 can be further configured to send a resource scheduling response message to the scheduler according to the resource scheduling message received by the receiving unit 702.

Figure 9:
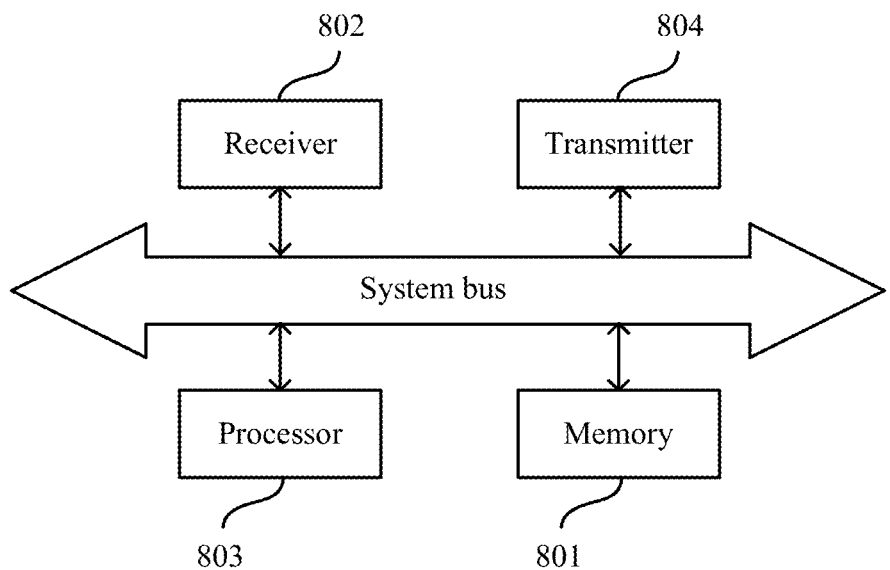
FIG. 9 is a structural diagram of a scheduler according to one embodiment.

FIG. 9 is a structural diagram of a scheduler according to one embodiment. The scheduler can be applied to an eMBMS and configured to perform the resource scheduling methods disclosed herein. The scheduler can include a memory 801, a receiver 802, a processor 803, and a transmitter 804.

For one embodiment, the memory 801 can be configured to store a program instruction. The processor 803 can be configured to perform, according to the program instruction stored in the memory 801, the following operation receiving, by using the receiver 802, a session start request message sent by a program source server, where the session start request message carries a SAI corresponding to a program source; sending, by using the transmitter 804 according to the SAI received by the receiver 802, the session start request message to a base station corresponding to the SAI; receiving, by using the receiver 802, a session start response message sent by the base station according to the session start request message; adding the base station to an IP multicast group according to the session start response message received by the receiver 802; sending a resource scheduling message to the base station by using the transmitter 804, where the resource scheduling message includes information regarding an MA resource allocated to the program source; and receiving, by using the receiver 802, a resource scheduling response message sent by the base station according to the resource scheduling message.

Optionally, the processor 803 can be further configured to perform, according to the program instruction stored in the memory 801, the following operation receiving, by using the receiver 802 before the receiving a session start request message sent by a program source server, an MA status request message sent by the program source server, where the MA status request message includes the SAI; searching, according to the SAI received by the receiver 802, for an MA status corresponding to the SAI, where the status is used to reflect a resource usage of an MA; and sending an MA status response message to the program source server by using the transmitter 804, where the MA status response message includes information regarding the MA status, so that the program source server selects a unicast manner or a broadcast manner according to the MA status to start a session. In another embodiment, the processor 803 can perform the operation of receiving, by using the receiver 802, a session start request message sent by a program source server including receiving, by using the receiver 802, the session start request message sent by the program source server, where the session start request message is used to start a session in the broadcast manner. For one embodiment, the processor 803 can be further configured to perform, according to the program instruction stored in the memory 801, the following operation, before the sending a resource scheduling message to the base station by using the transmitter 804, performing program admission and mapping according to the resource usage of the MA and a priority of a to-be-broadcast program of the program source; and allocating an MA air interface resource to at least one program that is successfully admitted and mapped.

Optionally, that the processor 803 can perform the operation of receiving, by using the receiver 802, a session start request message sent by a program source server includes receiving, by using the receiver 802, the session start request message sent by the program source server by using a broadcast-multicast service center.

Figure 10:
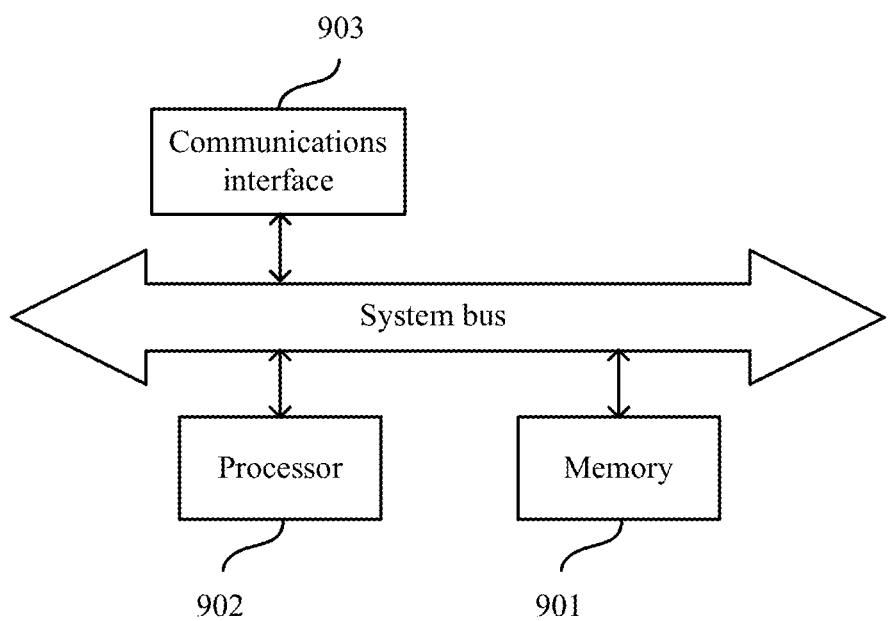
FIG. 10 is a structural diagram of a program source server according to one embodiment.

FIG. 10 is a structural diagram of a program source server according to one embodiment. The program source server can be applied to an eMBMS and configured to perform the resource scheduling methods disclosed herein. The program source server can include a memory 901, a processor 902, and a communications interface 903.

For one embodiment, the memory 901 can be configured to store a program instruction. The processor 902 can be configured to perform, according to the program instruction stored in the memory 901, the following operation sending a session start request message to a scheduler by using the communications interface 903, where the session start request message includes a SAI corresponding to a program source, so that the scheduler allocates an MA resource to the program source according to the SAI.

Optionally, the processor 902 can be further configured to perform, according to the program instruction stored in the memory 901, the following operations: sending an MA status request message to the scheduler before the sending a session start request message to a scheduler by using the communications interface 903, where the MA status request message includes the SAI receiving, by using the communications interface 903, an MA status response message sent by the scheduler, where the MA status response message carries information about an MA status corresponding to the SAI, and the status is used to reflect a resource usage of an MA; and selecting a unicast manner or a broadcast manner according to the received MA status to start a session.

In another embodiment, the processor 902 can perform the operation of selecting a unicast manner or a broadcast manner according to the received MA status to start a session including, when the received MA status reflects that the resource usage of the MA satisfies a preset condition, and a program on-demand rate in the MA exceeds a preset threshold, selecting the broadcast manner to start a session. Optionally, that the processor 902 can perform the operation of sending a session start request message to a scheduler by using the communications interface 903 includes sending the session start request message to the scheduler by using a broadcast-multicast service center.

Figure 11:
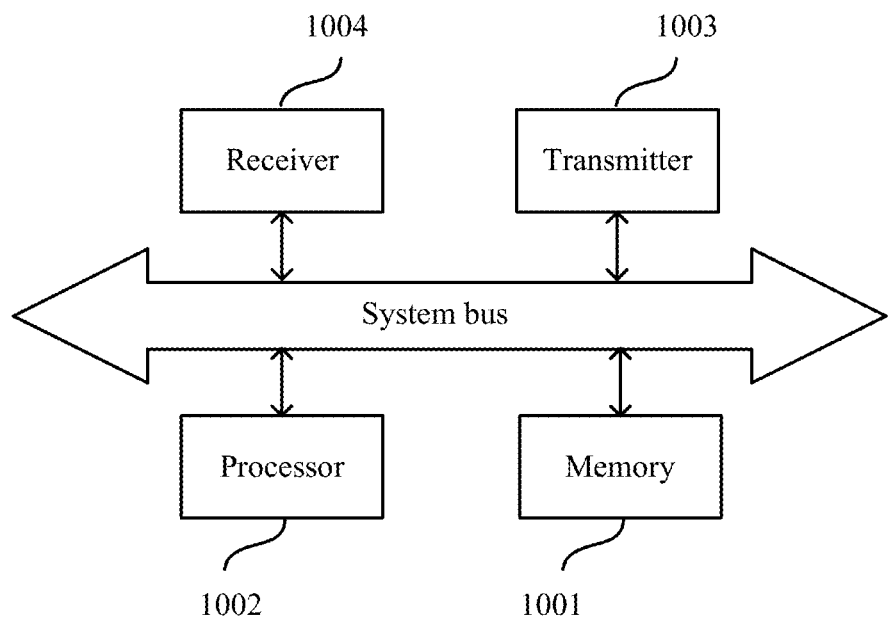
FIG. 11 is a structural diagram of a base station according to one embodiment.

FIG. 11 is a structural diagram of a base station according to one embodiment. The base station can be applied to an eMBMS and configured to perform the resource scheduling methods disclosed herein. The base station can include a memory 1001, a processor 1002, a transmitter 1003, and a receiver 1004.

For one embodiment, the memory 1001 can be configured to store a program instruction. The processor 1002 can be configured to perform, according to the program instruction stored in the memory 1001, the following operation receiving, by using the receiver 1004, a session start request message sent by a scheduler, where the session start request message carries a SAI corresponding to a program source; sending, by using the transmitter 1003, a session start response message to the scheduler according to the session start request message received by the receiver 1004; receiving, by using the receiver 1004, a resource scheduling message sent by the scheduler, where the resource scheduling message includes information regarding an MA resource allocated to the program source; and sending, by using the transmitter 1003, a resource scheduling response message to the scheduler according to the resource scheduling message received by the receiver 1004.

Figure 12:
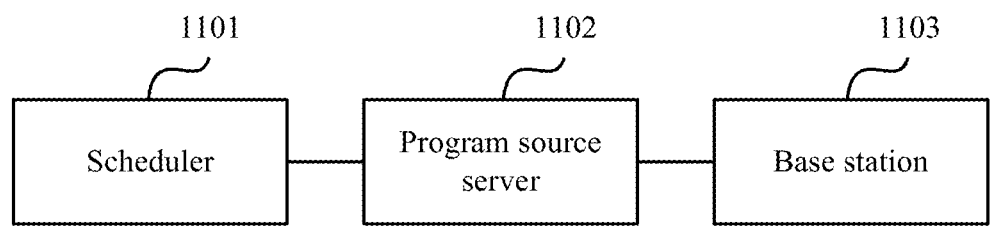
FIG. 12 is a structural diagram of a scheduling system according to one embodiment.

FIG. 12 is a structural diagram of a scheduling system according to one embodiment. The scheduling system can be applied to an eMBMS and configured to perform the resource scheduling methods disclosed herein. The scheduling system can include a scheduler 1101, a program source server 1102, and a base station 1103.

For one embodiment, the scheduler 1101 can be configured to: receive a session start request message sent by the program source server 1102, where the session start request message carries a SAI corresponding to a program source; send, according to the SAI, the session start request message to the base station 1103 corresponding to the SAI; receive a session start response message sent by the base station 1103 according to the session start request message; add the base station 1103 to an IP multicast group according to the session start response message; send a resource scheduling message to the base station 1103, where the resource scheduling message includes information regarding an MA resource allocated to the program source; and receive a resource scheduling response message sent by the base station 1103 according to the resource scheduling message.

For one embodiment, the program source server 1102 can be configured to send the session start request message to the scheduler 1101, where the session start request message carries the SAI corresponding to the program source, so that the scheduler 1101 allocates the MA resource to the program source according to the SAI.

For one embodiment, the base station 1103 can be configured to: receive the session start request message sent by the scheduler 1101, where the session start request message carries the SAI corresponding to the program source; send the session start response message to the scheduler 1101 according to the session start request message; receive the resource scheduling message sent by the scheduler 1101, where the resource scheduling message includes the information regarding the MA resource allocated to the program source; and send the resource scheduling response message to the scheduler 1101 according to the resource scheduling message.

In the detailed description, examples described in the embodiments may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. The foregoing methods of the embodiments may also be implemented by a program instructing a processor. The foregoing program may be stored in a computer readable storage medium. The storage medium may be a non-transitory computer-readable medium, such as a random-access memory, a read-only memory, a flash memory, a hard disk, a solid state drive, a magnetic tape, a floppy disk, an optical disc, or any combination thereof. The foregoing descriptions are merely example implementations of the present invention covered by the appending claims.

What is claimed is:

1. A scheduler, comprising:
   a memory storing instructions; and
   a processor coupled to the memory to execute the instructions to:
   receive a session start request message sent by a program source server, wherein the session start request message includes a service area identifier (SAI) corresponding to a program source;
   send the session start request message to a base station corresponding to the SAI;
   receive a session start response message sent by the base station according to the session start request message;
   add the base station to an Internet Protocol (IP) multicast group according to the session start response message received by the receiving unit;
   send a resource scheduling message to the base station, wherein the resource scheduling message includes information regarding a multimedia broadcast multicast service single frequency network area (MA) resource allocated to the program source; and
   receive a resource scheduling response message sent by the base station according to the resource scheduling message.

2. The scheduler according to claim 1, wherein the processor executes the instructions to:
   receive an MA status request message sent by the program source server, wherein the MA status request message carries the SAI, before the processor executes the instructions to receive the session start request message sent by the program source server;
   search for an MA status corresponding to the SAI, wherein the MA status is used to reflect a resource usage of an MA; and
   send an MA status response message to the program source server, wherein the MA status response message includes information regarding the MA status for the program source server selecting a unicast manner or a broadcast manner according to the MA status to start a session.

3. The scheduler according to claim 1, wherein the session start request message is used to start a session in the broadcast manner.

4. The scheduler according to claim 1, wherein the processor executes the instructions to:
   perform program admission and mapping according to the resource usage of the MA and a priority of a to-be-broadcast program of the program source; and
   allocate an MA air interface resource to at least one program that is successfully admitted and mapped.

5. The scheduler according to claim 1, wherein the session start request message is sent by the program source server by using a broadcast-multicast service center.

6. A server, comprising:
   a memory storing instructions; and
   a processor coupled to the memory to execute the instructions to:
   determine to initiate a broadcast request for a program source; and
   send a session start request message to a scheduler, wherein the session start request message includes a service area identifier (SAI) corresponding to the program source, for the scheduler allocating a multimedia broadcast multicast service single frequency network area (MA) resource to the program source according to the SAI.

7. The server according to claim 6, wherein the processor executes the instructions to:
send an MA status request message to the scheduler before the session start request message is sent to the scheduler, wherein the MA status request message carries the SAI; and
receive an MA status response message sent by the scheduler, wherein the MA status response message includes information regarding an MA status corresponding to the SAI, and the status is used to reflect a resource usage of an MA; and
select, according to the MA status received by the receiving unit, a unicast manner or a broadcast manner to start a session.

8. The server according to claim 7 wherein the processor executes the instructions to: in case that the MA status reflects that the resource usage of the MA satisfies a preset condition, and a program on-demand rate in the MA exceeds a preset threshold, select the broadcast manner to start a session.

9. The server according to claim 6, wherein the processor executes the instructions to:
send the session start request message to the scheduler by using a broadcast-multicast service center.

10. The scheduling system according to claim 6, the second programming instructions instruct the second processor to:
send the session start request message to the scheduler by using a broadcast-multicast service center.

11. A scheduling system, wherein the scheduling system is applied to an evolved multimedia broadcast multicast service (eMBMS), and the scheduling system comprises a scheduler and a program source server, wherein the scheduler comprising a first processor, and a first non-transitory computer-readable storage medium coupled to the first processor and storing first programming instructions for execution by the first processor, the first programming instructions instruct the first processor to:
receive a session start request message sent by the program source server, wherein the session start request message includes a service area identifier (SAI) corresponding to a program source;
send the session start request message to a base station corresponding to the SAI;
receive a session start response message sent by the base station according to the session start request message;
add the base station to an Internet Protocol (IP) multicast group according to the session start response message received by the receiving unit;
send a resource scheduling message to the base station, wherein the resource scheduling message includes information regarding a multimedia broadcast multicast service single frequency network area (MA) resource allocated to the program source; and
receive a resource scheduling response message sent by the base station according to the resource scheduling message.

12. The scheduling system according to claim 11, wherein the first programming instructions instruct the first processor to:
receive an MA status request message sent by the program source server, wherein the MA status request message includes the SAI, before the processor executes the instructions to receive the session start request message sent by the program source server;
search for an MA status corresponding to the SAI, wherein the MA status is used to reflect a resource usage of an MA; and
send an MA status response message to the program source server, wherein the MA status response message includes information about the MA status for the program source server selecting a unicast manner or a broadcast manner according to the MA status to start a session.

13. The scheduling system according to claim 11, wherein the session start request message is used to start a session in the broadcast manner.

14. The scheduling system according to claim 11, wherein the first programming instructions instruct the first processor to:
perform program admission and mapping according to the resource usage of the MA and a priority of a to-be-broadcast program of the program source; and
allocate an MA air interface resource to at least one program that is successfully admitted and mapped.

15. The scheduling system according to claim 11, wherein the session start request message is sent by the program source server by using a broadcast-multicast service center.

16. The scheduling system according to claim 11, wherein the program source server comprising a second processor, and a second non-transitory computer-readable storage medium coupled to the second processor and storing second programming instructions for execution by the processor, the second programming instructions instruct the second processor to:
send the session start request message to the scheduler.

17. The scheduling system according to claim 16, wherein the second programming instructions instruct the second processor to:
send an MA status request message to the scheduler before the session start request message is sent to the scheduler, wherein the MA status request message carries the SAI; and
receive an MA status response message sent by the scheduler, wherein the MA status response message includes information about an MA status corresponding to the SAI, and the status is used to reflect a resource usage of an MA; and
select, according to the MA status received by the receiving unit, a unicast manner or a broadcast manner to start a session.

18. The scheduling system according to claim 17 wherein the second programming instructions instruct the second processor to: in case that the MA status reflects that the resource usage of the MA satisfies a preset condition, and a program on-demand rate in the MA exceeds a preset threshold, select the broadcast manner to start a session.

* * * * *